(12) United States Patent
Chen et al.

(10) Patent No.: US 10,530,413 B2
(45) Date of Patent: Jan. 7, 2020

(54) WIRELESS SIGNAL TRANSCEIVER DEVICE WITH DUAL-POLARIZED ANTENNA WITH AT LEAST TWO FEED ZONES

(71) Applicant: RichWave Technology Corp., Taipei (TW)

(72) Inventors: You-Chieh Chen, Taipei (TW); Tse-Peng Chen, Taipei (TW); Shih-Kai Lin, Taipei (TW)

(73) Assignee: RichWave Technology Corp., Taipei (TW)

( * ) Notice: Subject to any disclaimer, the term of this patent is extended or adjusted under 35 U.S.C. 154(b) by 0 days.

(21) Appl. No.: 16/157,106

(22) Filed: Oct. 11, 2018

(65) Prior Publication Data

US 2019/0190562 A1    Jun. 20, 2019

Related U.S. Application Data

(60) Provisional application No. 62/607,922, filed on Dec. 20, 2017.

(30) Foreign Application Priority Data

Feb. 14, 2018    (TW) .............. 107105524 A

(51) Int. Cl.
*H04B 1/38* (2015.01)
*H01Q 9/04* (2006.01)
*H04B 1/48* (2006.01)
*H01Q 23/00* (2006.01)

(52) U.S. Cl.
CPC .............. *H04B 1/48* (2013.01); *H01Q 9/045* (2013.01); *H01Q 23/00* (2013.01)

(58) Field of Classification Search
CPC ... H04B 1/48; H04B 1/40; H04B 1/44; H04B 1/54; H01Q 23/00; H01Q 9/045
See application file for complete search history.

(56) References Cited

U.S. PATENT DOCUMENTS

| 5,966,102 A * | 10/1999 | Runyon ................. H01Q 1/246 343/797 |
| 6,229,484 B1 * | 5/2001 | Sagisaka .............. H01Q 21/065 343/700 MS |
| 8,664,955 B1 * | 3/2014 | Halpern ................. G01R 33/60 324/316 |

(Continued)

FOREIGN PATENT DOCUMENTS

| CN | 1898837 A | 1/2007 |
| EP | 2 688 143 B1 | 11/2017 |

*Primary Examiner* — Andrew Wendell
(74) *Attorney, Agent, or Firm* — Winston Hsu

(57) ABSTRACT

A wireless signal transceiver device includes a dual-polarized antenna, a transmission circuit and a reception circuit. The dual-polarized antenna is used to transmit a first wireless signal and receive a second wireless signal at the same time. The dual-polarized antenna includes a first feed zone and a second feed zone. The first feed zone is used to receive a transmission signal, and the first wireless signal is related to the transmission signal. The second feed zone is used to output a reception signal, and the reception signal is related to the second wireless signal. The transmission circuit is used to generate the transmission signal. The reception circuit is used to generate a processing signal, and the processing signal is related to the reception signal.

20 Claims, 8 Drawing Sheets

(56) References Cited

U.S. PATENT DOCUMENTS

| | | | |
|---|---|---|---|
| 2005/0099330 A1* | 5/2005 | Hausner | G01S 7/025 342/22 |
| 2005/0206568 A1* | 9/2005 | Phillips | H01Q 9/0414 343/700 MS |
| 2010/0302123 A1 | 12/2010 | Knudsen | |
| 2013/0044035 A1* | 2/2013 | Zhuang | H01Q 9/0428 343/770 |
| 2015/0194730 A1* | 7/2015 | Sudo | H01Q 9/045 343/905 |
| 2017/0134154 A1* | 5/2017 | Pratt | F01D 21/003 |
| 2017/0222306 A1* | 8/2017 | Biscontini | H01Q 1/246 |
| 2017/0264014 A1* | 9/2017 | Le-Ngoc | H01Q 21/24 |
| 2018/0269576 A1* | 9/2018 | Scarborough | H01Q 1/288 |

\* cited by examiner

WIRELESS SIGNAL TRANSCEIVER DEVICE WITH DUAL-POLARIZED ANTENNA WITH AT LEAST TWO FEED ZONES

CROSS REFERENCE TO RELATED APPLICATION

This application claims priority to Taiwan Patent Application No. 107105524, filed Feb. 14, 2018, and provisional Patent Application No. 62/607,922, filed Dec. 20, 2017, and incorporated herein by reference in its entirety.

TECHNICAL FIELD

The invention is related to a wireless signal transceiver device, and more particularly, a wireless signal transceiver device including a dual-polarized antenna with at least two feed zones.

BACKGROUND

In the field of wireless communications, dual-polarized antennas are widely used to perform wireless signal reception and transmission. However, in order to perform transmitting and receiving functions of a dual-polarized antenna, a common method is to receive an external wireless signal into a system using a reception antenna, and transmit a wireless signal outwards from the system to an external environment using a transmission antenna. Although such a structure can be used to transmit and receive wireless signals, two antennas such as the reception antenna and the transmission antenna are required. The two antennas occupy a large space, thereby it is difficult to reduce an overall size of the system.

SUMMARY

An embodiment provides a wireless signal transceiver device comprising a dual-polarized antenna, a transmission circuit and a reception circuit. The dual-polarized antenna is configured to transmit a first wireless signal and receive a second wireless signal substantially at the same time, wherein the first wireless signal is reflected by an object to generate the second wireless signal. The dual-polarized antenna comprises an antenna shape centroid; a first feed zone comprising a first zone shape centroid, and configured to receive a first transmission signal, wherein the first wireless signal is generated according to at least the first transmission signal; and a second feed zone comprising a second zone shape centroid, and configured to output a first reception signal generated according to the second wireless signal. A first direction defined from the first zone shape centroid to the antenna shape centroid is substantially orthogonal to a second direction defined from the second zone shape centroid to the antenna shape centroid. The transmission circuit is configured to generate the first transmission signal. The reception circuit is configured to generate a processing signal according to the first reception signal.

Another embodiment provides a wireless signal transceiver device comprising a dual-polarized antenna. The dual-polarized antenna is configured to transmit a first wireless signal and receive a second wireless signal substantially at the same time, and comprises an antenna shape centroid; a first feed zone comprising a first zone shape centroid, and configured to receive a first transmission signal, wherein the first wireless signal is generated according to at least the first transmission signal; and a second feed zone comprising a second zone shape centroid, and configured to output a first reception signal generated according to the second wireless signal. A first direction defined from the first zone shape centroid to the antenna shape centroid is substantially orthogonal to a second direction defined from the second zone shape centroid to the antenna shape centroid.

Another embodiment provides a wireless signal transceiver device comprising a first dual-polarized antenna, a first transmission circuit, a first reception circuit, a second dual-polarized antenna, a second transmission circuit and a second reception circuit. The first dual-polarized antenna is configured to transmit a first wireless signal and receive a second wireless signal substantially at the same time, and comprises an first antenna shape centroid; a first feed zone comprising a first zone shape centroid and configured to receive a first transmission signal wherein the first wireless signal is generated according to at least the first transmission signal; and a second feed zone comprising a second zone shape centroid and configured to output a first reception signal generated according to the second wireless signal. The first transmission circuit is configured to generate the first transmission signal. The first reception circuit is configured to generate a first processing signal related to the first reception signal. The second dual-polarized antenna is configured to transmit the second wireless signal and receive the first wireless signal substantially at the same time, and comprises an second antenna shape centroid; a third feed zone comprising a third zone shape centroid and configured to receive a second transmission signal wherein the second wireless signal is generated according to at least the second transmission signal; and a fourth feed zone comprising a fourth zone shape centroid and configured to output a second reception signal generated according to the first wireless signal. The second transmission circuit is configured to generate the second transmission signal. The second reception circuit is configured to generate a second processing signal related to the second reception signal. A first direction defined from the first zone shape centroid to the first antenna shape centroid is substantially orthogonal to a second direction defined from the second zone shape centroid to the first antenna shape centroid; a third direction defined from the third zone shape centroid to the second antenna shape centroid is substantially orthogonal to a fourth direction defined from the fourth zone shape centroid to the second antenna shape centroid; the first direction is substantially orthogonal to the third direction; and the second direction is substantially orthogonal to the fourth direction.

DETAILED DESCRIPTION

Figure 1:
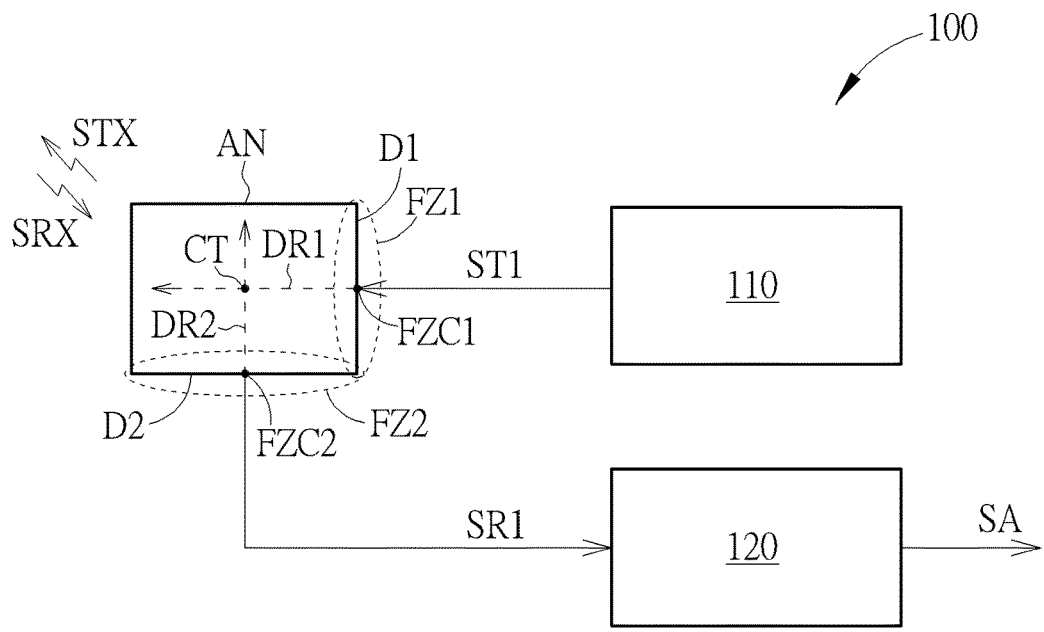
FIG. 1 illustrates a wireless signal transceiver device according to an embodiment.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The dual-polarized antenna may have a rectangular, square, circular or oval shape. The mentioned oval shape may be an elliptical shape of an accurate mathematic definition, an oval shape similar to an elliptical shape, a round shape or an oblong shape. In practice, related engineering simulations and device fine-tuning may be used to optimize the effect of transceiving signals. FIG. 1 illustrates a wireless signal transceiver device 100 according to an embodiment. The wireless signal transceiver device 100 may include a dual-polarized antenna AN, a transmission circuit 110 and a reception circuit 120. The dual-polarized antenna AN may be used to transmit a first wireless signal STX and receive a second wireless signal SRX substantially at the same time. The first wireless signal STX may be reflected by an object to generate the second wireless signal SRX. In an embodiment, the first wireless signal STX and the second wireless signal SRX may be radio frequency (RF) signals. During a time interval, since the first wireless signal STX is constantly reflected by an object, the second wireless signal SRX may be constantly received by the dual-polarized antenna AN, so the dual-polarized antenna AN may constantly transmit the first wireless signal STX and also receive the second wireless signal SRX substantially at the same time. In an embodiment, the waveform of the first wireless signal STX may be fixed or varied by time.

The dual-polarized antenna AN may include a feed zone FZ1 and a feed zone FZ2. The dual-polarized antenna AN may have an antenna shape centroid CT. The feed zone FZ1 may have a zone shape centroid FZC1, and the feed zone FZ2 may have a zone shape centroid FZC2. A direction DR1 may be defined from the zone shape centroid FZC1 to the antenna shape centroid CT. A direction DR2 may be defined from the zone shape centroid FZC2 to the antenna shape centroid CT. The direction DR1 may be substantially orthogonal to the direction DR2.

Figure 11:
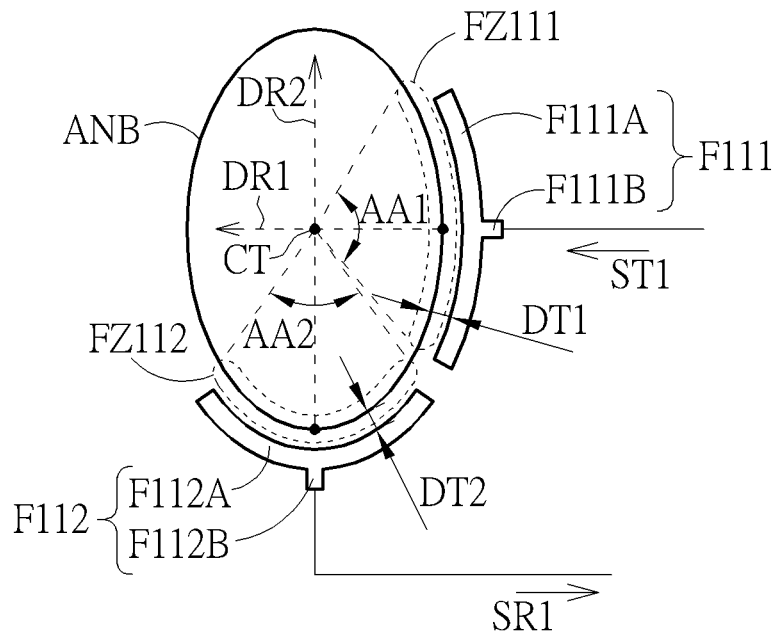
FIG. 11 illustrates a portion of a wireless signal transceiver device according to an embodiment.
Figure 12:
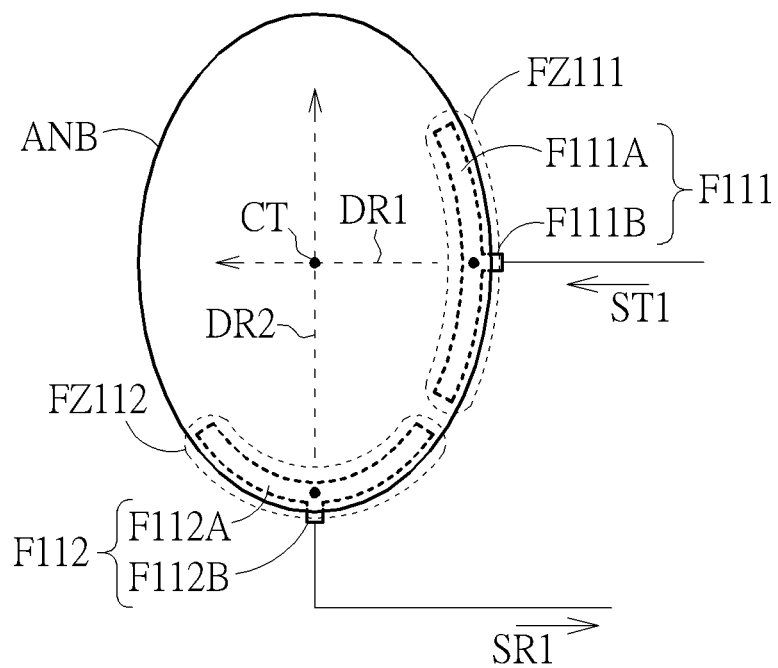
FIG. 12 illustrates a portion of a wireless signal transceiver device according to an embodiment.

According to embodiments of FIG. 1 to FIG. 10 and FIG. 13, the dual-polarized antenna AN, AN1, AN2 may have a rectangular shape as an example. Hence, the feed zone FZ1 of the dual-polarized antenna AN may include a first side D1 of the rectangle. The feed zone FZ2 of the dual-polarized antenna AN may include a second side D2 of the rectangle. The first side D1 may be substantially orthogonal to the second side D2. The zone shape centroids FZC1 and FZC2 may be respectively at the middle points of the first side D1 and the second side D2. According to the embodiment, the dual-polarized antenna AN may comprise a first antenna surface and a second antenna surface opposite to one another, the first antenna surface and the second antenna surface are separated by a thickness, the first antenna surface or the second antenna surface is coplanar with a reference plane. That is, the dual-polarized antenna AN may be a rectangular antenna with a thickness. However, as described above, the dual-polarized antenna AN may be not limited to a rectangular shape. In FIG. 11 and FIG. 12, embodiments of dual-polarized antennas ANB with another shape are described.

In FIG. 1, the first side D1 is used to receive a first transmission signal ST1, and the first wireless signal STX may relate to the first transmission signal ST1. The first side D1 and the second side D2 may be orthogonal to one another. According to embodiments, the first side D1 and the second side D2 may be adjacent to one another and have substantially the same length. The dual-polarized antenna AN may have a square shape.

According to the embodiment, a polarity of a wireless signal transmitted or received by the dual-polarized antenna AN may be orthogonal to a direction of an induced current. Hence, the first wireless signal STX and the second wireless signal SRX may hardly interfere with one another on the dual-polarized antenna AN. The length of each of the first side D1 and the second side D2 may be approximately half a wavelength of the first wireless signal STX or the second wireless signal SRX.

The second side D2 may be used to transmit the first reception signal SR1 related to the second wireless signal SRX. The transmission circuit 110 and the reception circuit 120 may be coupled to the dual-polarized antenna AN or substantially insulated from the dual-polarized antenna AN. In an embodiment, the transmission circuit 110 and the reception circuit 120 may be coupled to the dual-polarized antenna AN, the transmission circuit 110 is coupled to the first side D1 and used to generate the first transmission signal ST1, and the reception circuit 120 is coupled to the second side D2 and used to generate a processing signal SA related to the first reception signal SR1. According to the embodiment, the first wireless signal STX may be generated according to at least the first transmission signal ST1, and the first reception signal SR1 may be generated according to the second wireless signal SRX.

Figure 2:
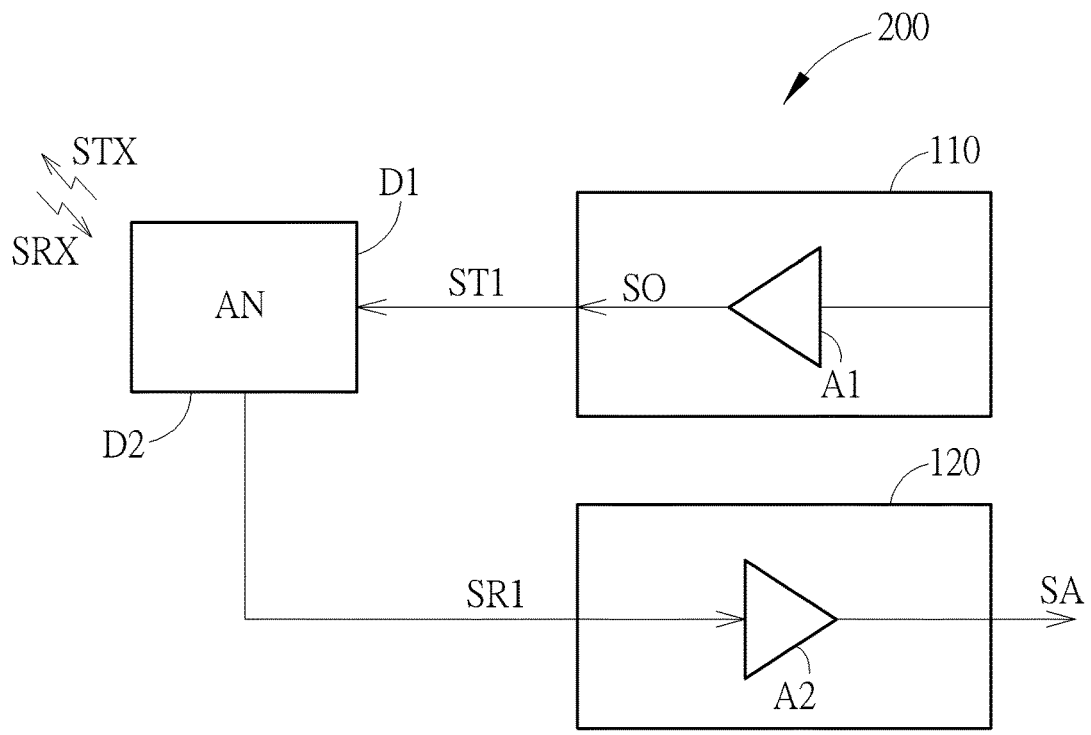
FIG. 2 illustrates a wireless signal transceiver device according to another embodiment.

FIG. 2 illustrates a wireless signal transceiver device 200 according to another embodiment. The wireless signal transceiver device 200 may be an embodiment of the wireless signal transceiver device 100. As shown in FIG. 2, the transmission circuit 110 may include a first amplifier A1. The first transmission signal ST1 may be corresponding to an output signal SO outputted by the first amplifier A1. The reception circuit 120 may include a second amplifier A2, and the second amplifier A2 may be used to amplify the first reception signal SR1 and output the processing signal SA. According to the embodiment, the output signal SO may include a single signal or a pair of signals having a specific phase difference. The first amplifier A1 may be a power amplifier, and the second amplifier A2 may be a low noise amplifier (LNA).

Figure 3:
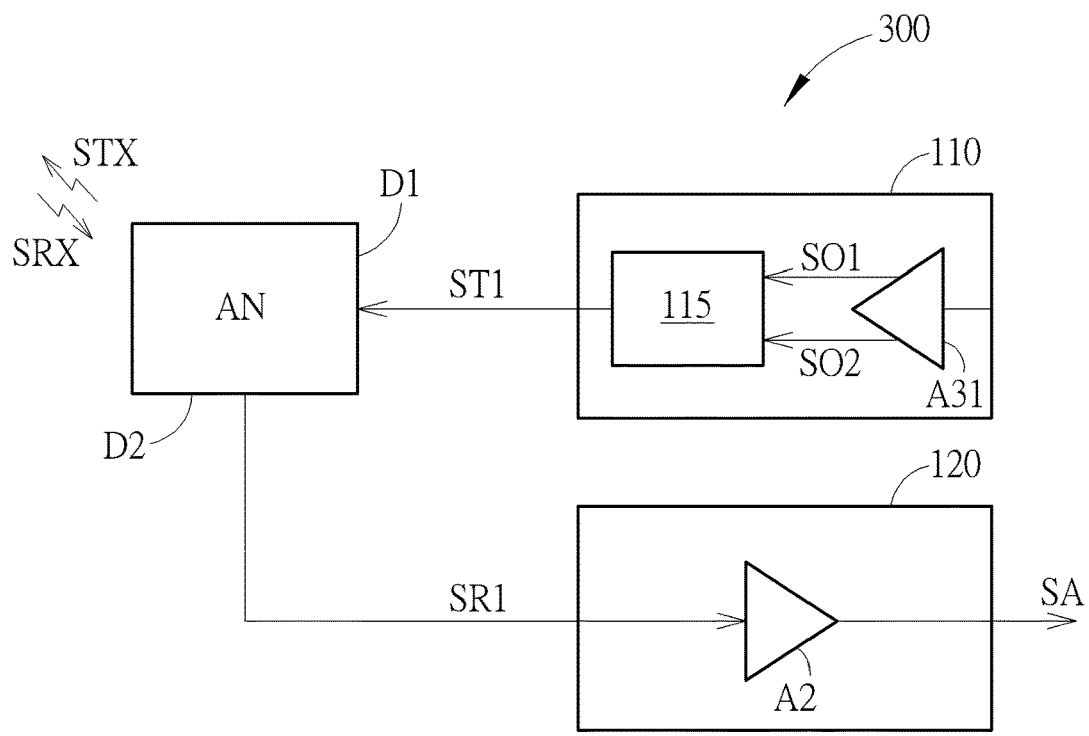
FIG. 3 illustrates a wireless signal transceiver device according to another embodiment.

FIG. 3 illustrates a wireless signal transceiver device 300 according to another embodiment. The wireless signal transceiver device 300 may be an embodiment of the wireless signal transceiver device 100. As shown in FIG. 3, the transmission circuit 110 may include a combiner 115 and a first amplifier A31. The combiner 115 may be coupled between the first side D1 of the dual-polarized antenna AN and the first amplifier A31, and used to receive a first output signal SO1 and a second output signal SO2 outputted from the first amplifier A31, generate the first transmission signal ST1 by combining the first output signal SO1 and the second output signal SO2, and output the first transmission signal ST1 to the first side D1. In FIG. 3, the first amplifier A31 may have two output terminals for outputting the first output signal SO1 and the second output signal SO2 which may form a pair of differential signals.

Figure 4:
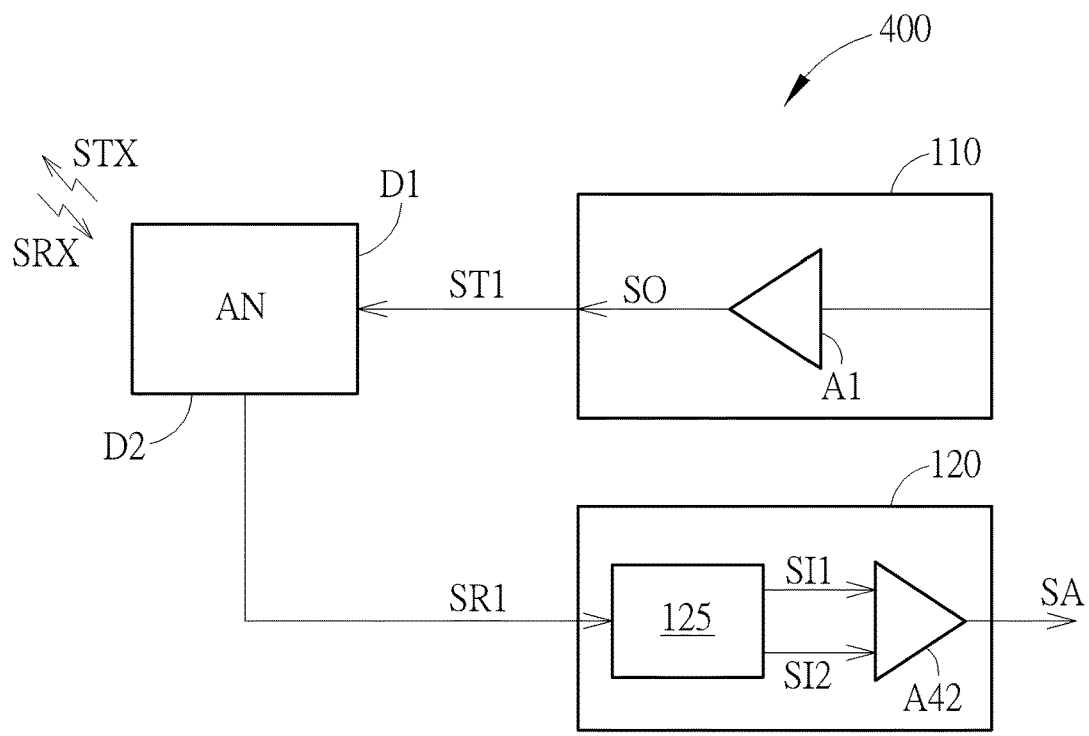
FIG. 4 illustrates a wireless signal transceiver device according to another embodiment.

FIG. 4 illustrates a wireless signal transceiver device 400 according to another embodiment. The wireless signal transceiver device 400 may be an embodiment of the wireless signal transceiver device 100. As shown in FIG. 4, the reception circuit 120 may include a coupler 125 and a second amplifier A42. The coupler 125 may be coupled between the second side D2 of the dual-polarized antenna AN and the second amplifier A42, and used to receive the first reception signal SR1, convert the first reception signal SR1 to a first input signal SI1 and a second input signal SI2, and transmit the first input signal SI1 and the second input signal SI2 to the second amplifier A42. As shown in FIG. 4, the second amplifier A42 may be used to generate the processing signal SA according to the first input signal SI1 and the second input signal SI2, and the first input signal SI1 and the second input signal SI2 may form a pair of differential signals.

Figure 5:
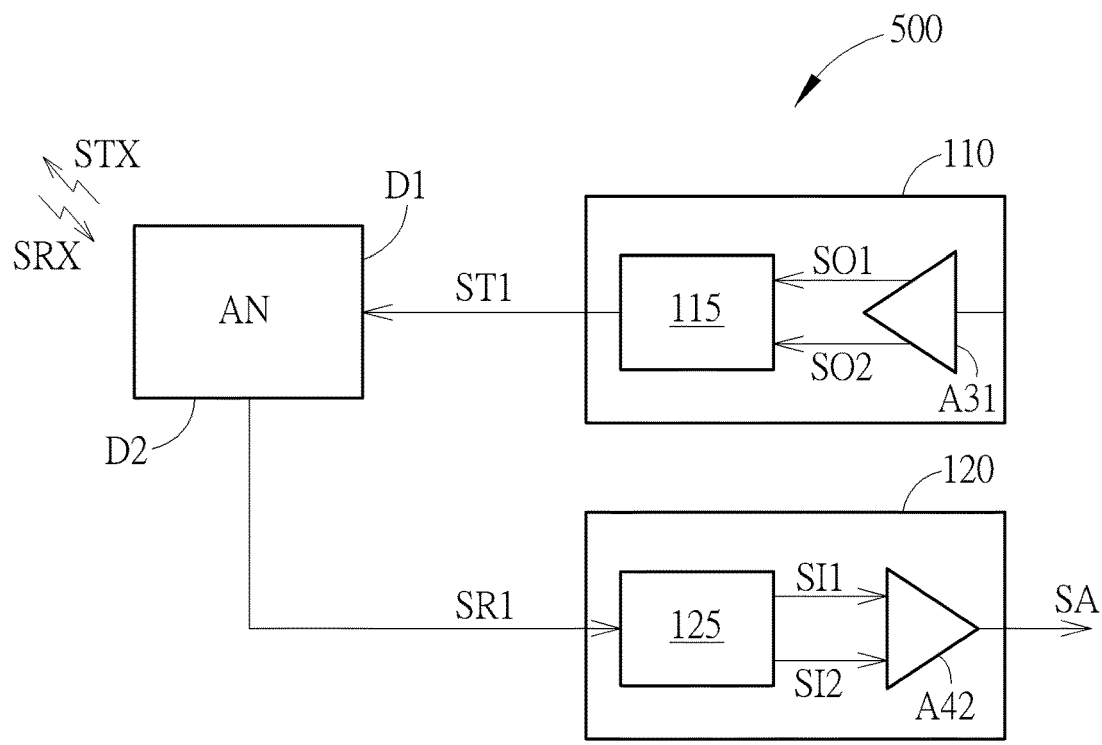
FIG. 5 illustrates a wireless signal transceiver device according to another embodiment.

FIG. 5 illustrates a wireless signal transceiver device 500 according to another embodiment. The wireless signal transceiver device 500 may be an embodiment of the wireless signal transceiver device 100. The transmission circuit 110 in FIG. 5 may include a combiner 115 and a first amplifier A31 as shown in FIG. 3, and the reception circuit 120 of FIG. 5 may include a coupler 125 and a second amplifier A42 as shown in FIG. 4. The related operations are not described repeatedly.

Figure 6:
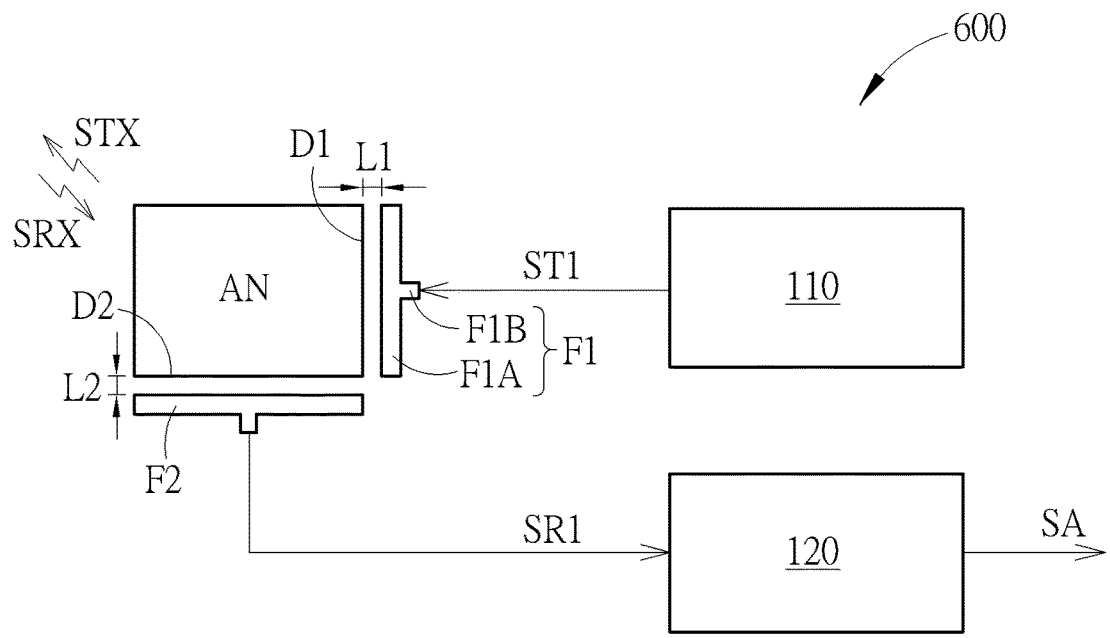
FIG. 6 illustrates a wireless signal transceiver device according to another embodiment.

FIG. 6 illustrates a wireless signal transceiver device 600 according to another embodiment. In this embodiment, the transmission circuit 110 and the reception circuit 120 may be substantially insulated from the dual-polarized antenna AN. As shown in FIG. 6, the wireless signal transceiver device 600 may include feed elements F1 and F2. Each of the feed elements F1 and F2 may have a T shape. For example, the feed element F1 may have a strip conductor F1A and a conductive line F1B. Similarly, the feed element F2 may have the two portions. The feed element F1 may be disposed corresponding to the first side D1 and used to receive the first transmission signal ST1 generated by the transmission circuit 110 and feed the first transmission signal ST1 to the dual-polarized antenna AN through electromagnetic induction. The feed element F1 and the transmission circuit 110 may be substantially insulated from the dual-polarized antenna AN. The feed element F2 may be disposed corresponding to the second side D2, and used to be fed with the first reception signal SR1 from the dual-polarized antenna AN through electromagnetic induction and transmit the first reception signal SR1 to the reception circuit 120. The feed element F2 and reception circuit 120 may be substantially insulated from the dual-polarized antenna AN.

According to embodiments, the feed element F1 may be (but not limited to) a T shape feed element, and the strip conductor F1A is formed as a straight strip disposed along an edge of the dual-polarized antenna AN correspondingly. The strip conductor F1A and the first side D1 of the dual-polarized antenna AN may be in parallel and be separated by a first distance L1. The strip conductor F1A may have a length 0.5 to 1 times a length of the first side D1. The first distance L1 may be related to impedance corresponding to the first transmission signal ST1. The feed element F1 may receive the first transmission signal ST1 through a middle position of the strip conductor F1A and the conductive line F1B. The feed element F2 may be (but not limited to) a T shape feed element. The strip conductor of the feed element F2 and the second side D2 of the dual-polarized antenna AN may be in parallel and be separated by a second distance L2. The strip conductor of the feed element F2 may have a length 0.5 to 1 times a length of the second side D2. The second distance L2 may be related to impedance corresponding to the first reception signal SR1. The feed element F2 may transmit the first reception signal SR1 through a middle position of the strip conductor and the conductive line of the feed element F2.

Figure 7:
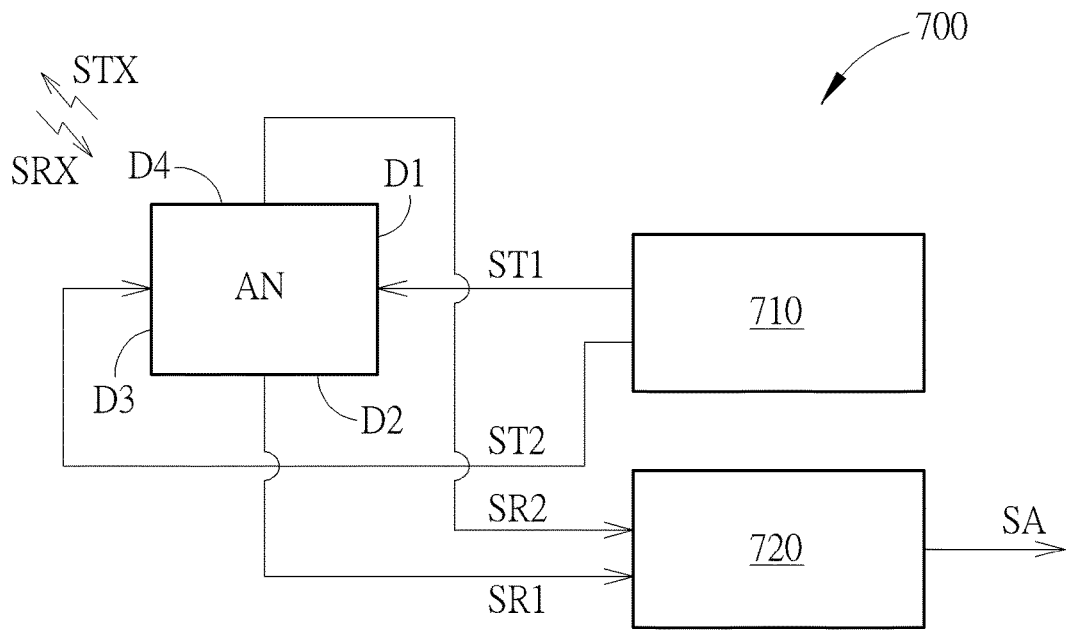
FIG. 7 illustrates a wireless signal transceiver device according to another embodiment.

FIG. 7 illustrates a wireless signal transceiver device 700 according to another embodiment. The wireless signal transceiver device 700 may include a dual-polarized antenna AN, a transmission circuit 710 and a reception circuit 720. In addition to the first side D1 and the second side D2 described above, the dual-polarized antenna AN may further include a third side D3 opposite to the first side D1. The third side D3 may be substantially orthogonal to the second side D2, coupled to the transmission circuit 710, and used to receive a second transmission signal ST2. The first wireless signal STX may be generated according to the first transmission signal ST1 and the second transmission signal ST2. The transmission circuit 710 may be used to transmit the first transmission signal ST1 and the second transmission signal ST2. As shown in FIG. 7, the dual-polarized antenna AN may further include a fourth side D4 opposite to the second side D2. The fourth side D4 may be substantially orthogonal to the first side D1, coupled to the reception circuit 720, and used to transmit a second reception signal SR2. The first reception signal SR1 and the second reception signal SR2 may be generated according to the second wireless signal SRX. The reception circuit 720 may be used to receive the first reception signal SR1 and the second reception signal SR2 and generate the processing signal SA according to the first reception signal SR1 and the second reception signal SR2. The first transmission signal ST1 and the second transmission signal ST2 may form a pair of differential signals. The first reception signal SR1 and the second reception signal SR2 may form a pair of differential signals. The relationship among the third side D3, the fourth side D4, feed zones corresponding to the sides D3 and D4, and the antenna shape centroid CT may be similar to the relationship among the first side D1, the second side D2, the feed zones FZ1 and FZ2, and the antenna shape centroid CT shown in FIG. 1, so it is not described repeatedly. However, a third direction defined from a third zone shape centroid corresponding to the third side D3 to the antenna shape centroid CT may be opposite to the first direction DR1. A fourth direction defined from a fourth zone shape centroid corresponding to the fourth side D4 to the antenna shape centroid CT may be opposite to the second direction DR2.

Figure 8:
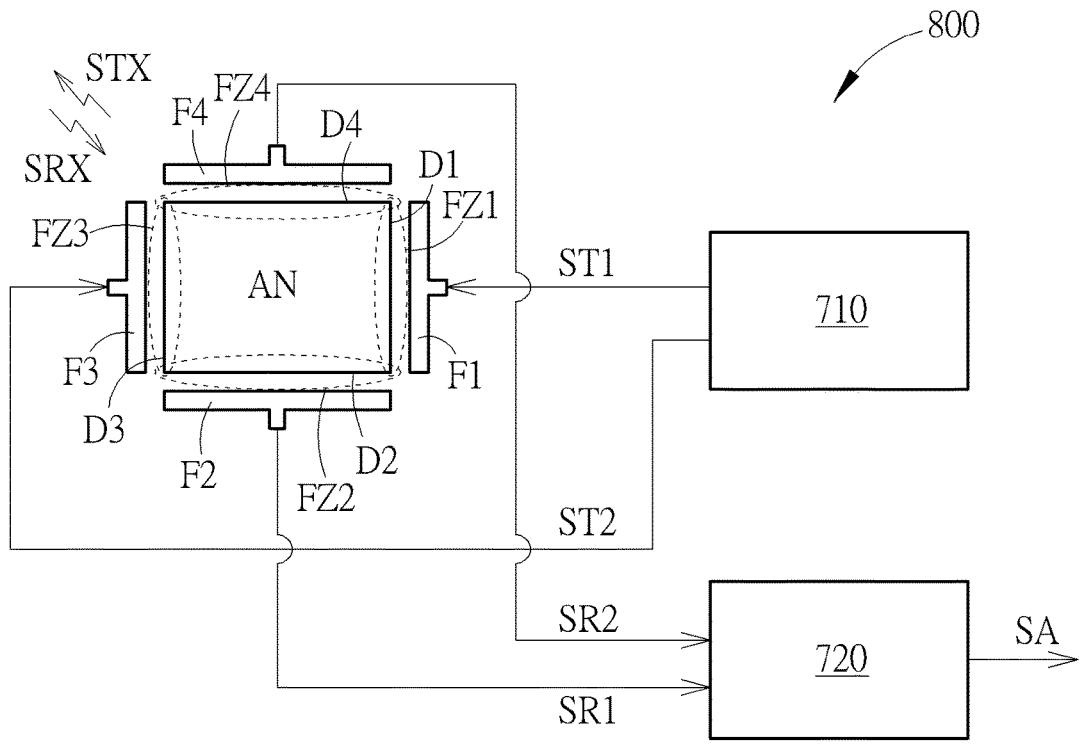
FIG. 8 illustrates a wireless signal transceiver device according to another embodiment.

FIG. 8 illustrates a wireless signal transceiver device 800 according to another embodiment. Similarities between FIG. 8 and FIG. 7 are not described repeatedly. As shown in FIG. 8, the wireless signal transceiver device 800 may include feed elements F1 to F4. Like FIG. 1 and FIG. 6, the dual-polarized antenna AN may have four feed zones FZ1 to FZ4 respectively including the first side D1 to the fourth side D4. The feed elements F1 and F2 may be as described above. The third feed element F3 may be similar to the feed element F1 and be disposed corresponding to the third side D3 of the dual-polarized antenna AN for receiving the second transmission signal ST2 and feeding the second transmission signal ST2 to the dual-polarized antenna AN through electromagnetic induction. The feed element F3 may be substantially insulated from the dual-polarized antenna AN, and a distance between the feed element F3 and the dual-bipolarized antenna AN may be related to impedance corresponding to the second transmission signal ST2. The fourth feed element F4 may be similar to the feed element F2 and be disposed corresponding to the fourth side D4 of the dual-polarized antenna AN for being fed with the second reception signal SR2 through electromagnetic induction and transmitting the second reception signal SR2 to the reception circuit 720. The feed element F4 may be substantially insulated from the dual-polarized antenna AN, and a distance between the feed element F4 and the dual-bipolarized antenna AN may be related to impedance corresponding to the second reception signal SR2. The first transmission signal ST1 and the second transmission signal ST2 may form a pair of differential signals, and the first reception signal SR1 and the second reception signal SR2 may forma pair of differential signals. The relationship among the third side D3, the fourth side D4, the feed zones FZ3 and FZ4 corresponding to the sides D3 and D4, and the antenna shape centroid CT may be similar to the relationship among the first side D1, the second side D2, the corresponding feed zones FZ1 and FZ2, and the antenna shape centroid CT shown in FIG. 1, so it is not described repeatedly. However, a third direction defined from a third zone shape centroid of the third feed zone FZ3 to the antenna shape centroid CT may be opposite to the first direction DR1. A fourth direction defined from a fourth zone shape centroid of the fourth feed zone FZ4 to the antenna shape centroid CT may be opposite to the second direction DR2.

Figure 9:
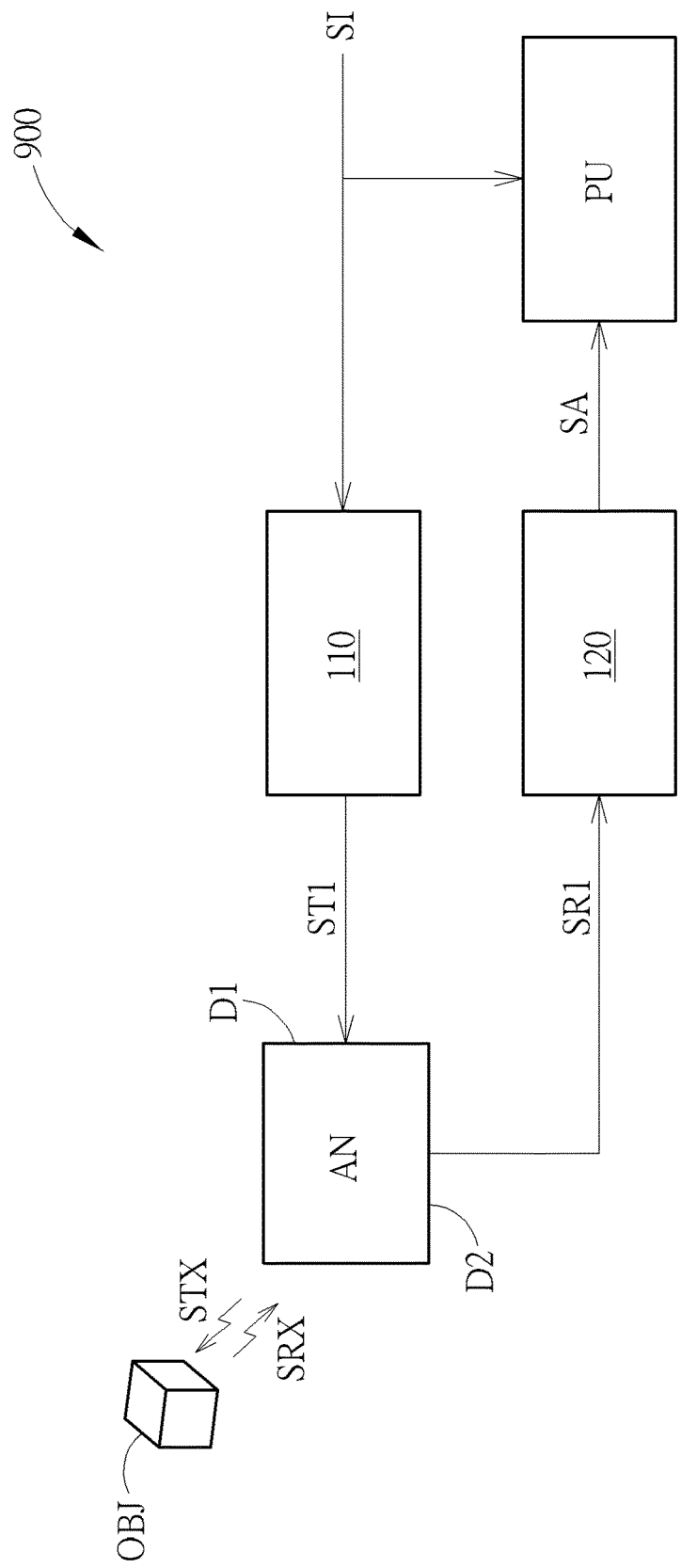
FIG. 9 illustrates a wireless signal transceiver device according to another embodiment.

FIG. 9 illustrates a wireless signal transceiver device 900 according to another embodiment. As shown in FIG. 9, the first wireless signal STX may be reflected by an object OBJ to generate the second wireless signal SRX. The transmission circuit 110 may be used to generate the first transmission signal ST1 according to an input signal SI. The wireless signal transceiver device 900 may further include a processing unit PU. The processing unit PU may be coupled to the transmission circuit 110 and the reception circuit 120 and used to generate spatial information of the object OBJ according to the processing signal SA and the input signal SI. In other words, the wireless signal transceiver device 900 may be used to detect the spatial information of the object OBJ such as at least one of a distance between the wireless signal transceiver device 900 and the object OBJ, a moving speed of the object OBJ, a moving angle of the object OBJ and time of detecting the object OBJ.

Figure 10:
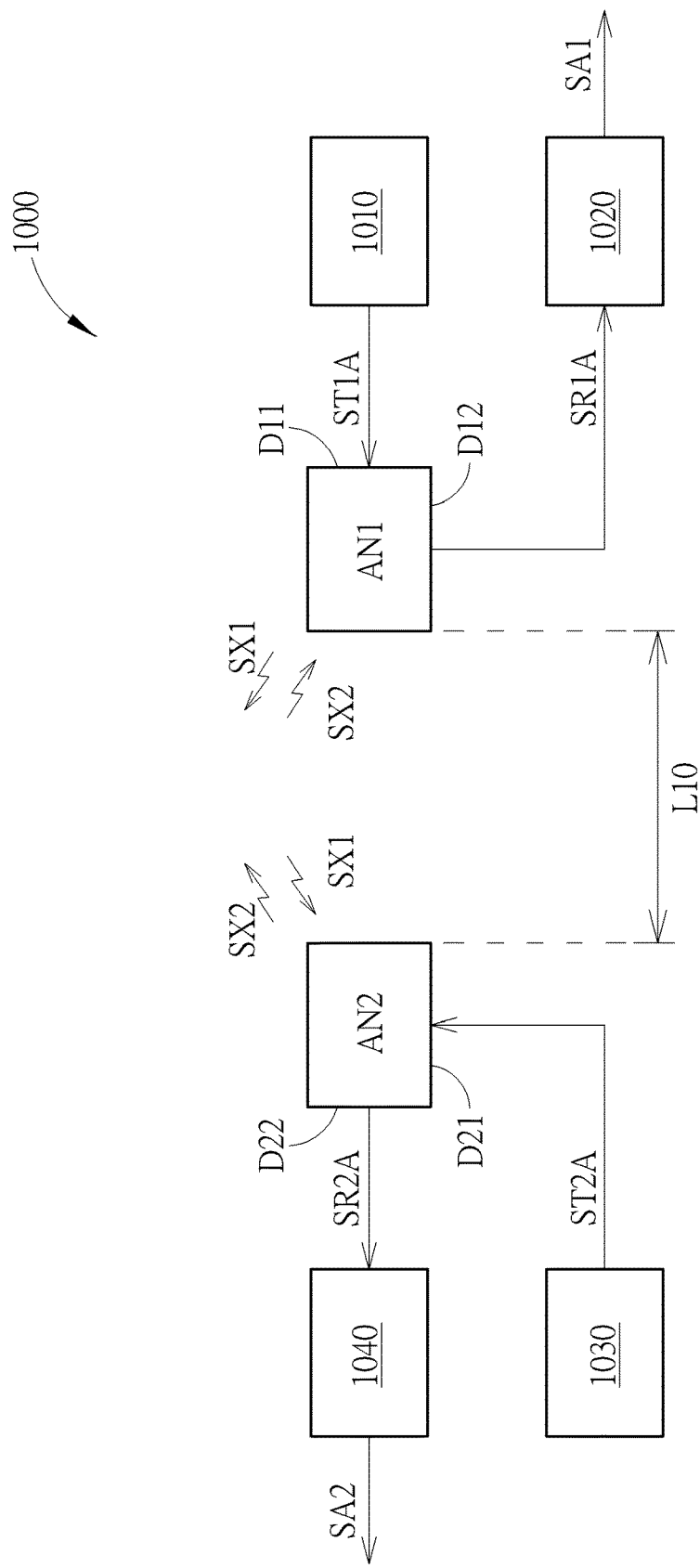
FIG. 10 illustrates a wireless signal transceiver device according to another embodiment.

FIG. 10 illustrates a wireless signal transceiver device 1000 according to another embodiment. The wireless signal transceiver device 1000 may include two dual-polarized antennas AN1 and AN2, two transmission circuits 1010 and 1030, and two reception circuits 1020 and 1040.

The dual-polarized antenna AN1 may be used to transmit a first wireless signal SX1 and receive a second wireless signal SX2 substantially at the same time. Each of the dual-polarized antennas AN1 and AN2 may be designed to be similar to the dual-polarized antennas AN of FIG. 1. The dual-polarized antenna AN1 may include a first feed zone, a second feed zone and a first antenna shape centroid. The first feed zone may include a first side D11 and a first zone shape centroid, and the second feed zone may include a second side D12 and a second zone shape centroid. A first direction defined from the first zone shape centroid to the first antenna shape centroid may be substantially orthogonal to a second direction defined from the second zone shape centroid to the first antenna shape centroid. The first side D11 may be used to receive a first transmission signal ST1A where the first wireless signal SX1 is related to the first transmission signal ST1A. The second side D12 may be used to transmit the first reception signal SR1A related to the second wireless signal SX2. The transmission circuit 1010 may be coupled to the first side D11 of the dual-polarized antenna AN1 and used to generate the first transmission signal ST1A. The reception circuit 1020 may be coupled to the second side D12 of the dual-polarized antenna AN1 and used to generate a processing signal SA1 related to the first reception signal SR1A.

The dual-polarized antenna AN2 may be used to transmit the second wireless signal SX2 and receive the first wireless signal SX1 substantially at the same time. Like the dual-polarized antenna AN1, the dual-polarized antenna AN2 may include a first feed zone, a second feed zone and a second antenna shape centroid. The first feed zone may include a first side D21 and a first zone shape centroid, and the second feed zone may include a second side D22 and a second zone shape centroid. A third direction defined from the first zone shape centroid of the dual-polarized antenna AN2 to the second antenna shape centroid may be substantially orthogonal to a fourth direction defined from the second zone shape centroid of the dual-polarized antenna AN2 to the second antenna shape centroid. The first side D21 may be used to receive a second transmission signal ST2A where the second wireless signal SX2 is related to the second transmission signal ST2A. The second side D22 may be used to transmit the second reception signal SR2A related to the first wireless signal SX1. The transmission circuit 1030 may be coupled to the first side D21 and used to generate the second transmission signal ST2A. The reception circuit 1040 may be coupled to the second side D22 and used to generate a processing signal SA2 related to the second reception signal SR2A. As shown in FIG. 10, The first direction may be substantially orthogonal to the third direction, and the second direction may be substantially orthogonal to the fourth direction.

According to embodiments, the first wireless signal SX1 and the second wireless signal SX2 may be radio frequency signals. During a time interval, since the first wireless signal SX1 may be constantly transmitted by the dual-polarized antenna AN1, the first wireless signal SX1 may be constantly received by the dual-polarized antenna AN2; and since the second wireless signal SX2 may be constantly transmitted by the dual-polarized antenna AN2, the second wireless signal SX2 may be constantly received by the dual-polarized antenna AN1. In other words, the dual-polarized antenna AN1 may be used to constantly transmit the first wireless signal SX1 and receive the second wireless signal SX2 substantially at the same time. Conversely, the dual-polarized antenna AN2 may be used to constantly transmit the second wireless signal SX2 and receive the first wireless signal SX1 substantially at the same time. According to embodiments, the waveforms of the first wireless signals SX1 and the second wireless signal SX2 may be fixed or varied by time, and the waveforms may be determined according to data included in the processing signals SA1 and SA2.

According to an embodiment, the dual-polarized antennas AN1 and AN2 may be separated by a distance L10. The first side D11 of the dual-polarized antenna AN1 may be orthogonal to the second side D12 of the dual-polarized antenna AN1. The first side D11 of the dual-polarized antenna AN1 may be orthogonal to the first side D21 of the dual-polarized antenna AN2. The first side D21 of the dual-polarized antenna AN2 may be orthogonal to the second side D22 of the dual-polarized antenna AN2.

According to embodiments, the first side D11 and the second side D12 of the dual-polarized antenna AN1 may be adjacent to one another. The first side D21 and the second side D22 of the dual-polarized antenna AN2 may be adjacent to one another.

As shown in FIG. 10, wireless data communications may be performed by means of the wireless signal transceiver device 1000. For example, when the distance L10 is 100 meters, wireless data communications of 100 meters between the dual-polarized antennas AN1 and AN2 may be performed.

According to embodiments, the first wireless signal SX1 may be generated according to at least the first transmission signal ST1A. The first reception signal SR1A may be generated according to the second wireless signal SX2. The second wireless signal SX2 may be generated according to at least the second transmission signal ST2A. The second reception signal SR2A may be generated according to the first wireless signal SX1.

According to embodiments, the first side D11 of the dual-polarized antenna AN1 and the second side D22 of the dual-polarized antenna AN2 may be dual-polarized antenna portions corresponding to one another when transceiving wireless signals. The first side D21 of the dual-polarized antenna AN2 and the second side D12 of the dual-polarized antenna AN1 may be dual-polarized antenna portions corresponding to one another when transceiving wireless signals. Hence, the first side D11 and the second side D22 may have a substantially same length, and be in parallel/overlapped in projection with one another. The first side D21 and the second side D12 may have a substantially same length, and be in parallel/overlapped in projection with one another.

According to embodiments, the first side D11 and the second side D12 may have a substantial same length. For example, because lengths of sides of a dual-polarized antenna for feeding a signal may relate to a frequency of the signal, the first side D11 and the second side D12 may be designed to have a substantial same length when using a fixed frequency to perform time-division data transmission.

According to another embodiment, the first side D11 and the second side D12 of the dual-polarized antenna AN1 may have different lengths. For example, when using different frequencies to perform time-division data transmission, the first side D11 and the second side D12 may be designed to have different lengths. According to another embodiment, the first side D11 of the dual-polarized antenna AN1 and the second side D22 of the dual-polarized antenna AN2 may have substantially the same first length, the second side D12 of the dual-polarized antenna AN1 and the first side D21 of the dual-polarized antenna AN2 may have substantially the same second length, and the first length is different with the second length.

According to embodiments, each of the dual-polarized antennas AN1 and AN2 may have a square or rectangular shape. A feed element may be disposed corresponding to each side of the dual-polarized antennas AN1 and AN2 as shown in FIG. 6 and FIG. 8 to feed a signal to or from an antenna through electromagnetic induction.

According to embodiments, the dual-polarized antennas AN1 and AN2 may be used to transmit or receive a pair of differential signals as shown in FIG. 6 and FIG. 8.

In FIG. 1 to FIG. 10 and FIG. 13, each of the dual-polarized antennas has a rectangular shape. FIG. 1 to FIG. 10 and FIG. 13 are merely examples, and a dual-polarized antenna with an oval shape as shown in FIG. 11 may be coupled and configured as shown in FIG. 1 to FIG. 10 and FIG. 13.

FIG. 11 illustrates a portion of a wireless signal transceiver device according to an embodiment. In FIG. 11, the transmission circuit 110 and the reception circuit 120 of FIG. 1 are omitted, and a dual-polarized antenna ANB and feed elements F111 and F112 are illustrated. The feed elements F111 and F112 may be disposed corresponding to feed zones FZ111 and FZ112. The dual-polarized antenna ANB may have an oval shape and be different from the rectangular antennas in FIG. 1 to FIG. 10 and FIG. 13. The feed element F111 may include a strip conductor F111A and a conductive line F111B. The strip conductor F111A may be disposed along an edge of the dual-polarized antenna ANB, and the strip conductor F111A and the edge of the dual-polarized antenna ANB may be in parallel. In other words, when the dual-polarized antenna ANB have an oval shape or a circle shape, the strip conductor F111A may have an arc shape. Likewise, the feed element F112 may include a strip conductor F112A and a conductive line F112B with a shape described above. The strip conductor F111A and the edge of the dual-polarized antenna ANB may be separated by a distance DT1. The distance DT1 may be related to impedance corresponding to a transmitted signal. When the dual-polarized antenna ANB is applied in a scenario of FIG. 6 as an example, the conductive line F111B may be coupled to a middle position of the strip conductor F111A to receive the first transmission signal ST1. Similarly, the conductive line F112B of the feed element F112 may be used to transmit the first reception signal SR1. Like FIG. 1, the dual-polarized antenna ANB in FIG. 11 may have feed zones FZ111 and FZ112, and an antenna shape centroid CT. Each of the feed zones FZ111 and FZ112 may have a zone shape centroid. A first direction DR1 may be defined from the zone shape centroid of the feed zone FZ111 to the antenna shape centroid CT, and a second direction DR2 may be defined from the zone shape centroid of the feed zone FZ112 to the antenna shape centroid CT. The first direction DR1 may be orthogonal to the second direction DR2. An angle AA1 formed with the feed zone FZ111 and the antenna shape centroid CT may be approximately in a range of 22.5 to 120 degrees. An angle AA2 formed with the feed zone FZ112 and the antenna shape centroid CT may be approximately in a range of 22.5 to 120 degrees. A sum of the angles AA1 and AA2 may be less than or equal to 180 degrees.

The dual-polarized antenna ANB may have a first antenna surface and a second antenna surface opposite to one another, the first antenna surface and the second antenna surface are separated by a thickness. The first antenna surface or the second antenna surface may be coplanar with a reference plane. Projection areas of the strip conductors F111A and F112A onto the reference plane may be outside a projection area of the dual-polarized antenna ANB onto the reference plane without overlapping. The strip conductor F111A, the conductive line F111B and the reference plane may be coplanar with one another. The strip conductor F111A and the edge of the dual-polarized antenna ANB may be in parallel and be separated by a distance DT1. The strip conductor F112A and the conductive line F112B may be similar to the strip conductor F111A and the conductive line F111B, and the strip conductor F112A and the edge of the dual-polarized antenna ANB may be in parallel and be separated by a distance DT2. For example, the dual-polarized antenna ANB may be formed on a metal layer of a circuit board such as (but not limited to) a printed circuit board, and the feed elements may be formed on a same metal layer. According to other embodiments, an antenna and feed elements may be formed on different metal layers to be disposed as FIG. 11.

FIG. 12 illustrates a portion of a wireless signal transceiver device according to an embodiment. Like FIG. 11, FIG. 12 merely illustrates the dual-polarized antenna ANB and the feed elements F111A and F111B. However, in FIG. 12, projection areas of the strip conductors F111A and F112A onto a reference plane may be within a projection area of the dual-polarized antenna ANB onto the reference plane, so the projection areas of the strip conductors F111A and F112A may overlap the projection area of the dual-polarized antenna ANB in a vertical direction. The strip conductor and the conductive line of each of the feed elements F111 and F112 may be coplanar with one another. The strip conductor may be on a plane which is parallel with the reference plane and is separated from the reference plane by a vertical distance. For example, the dual-polarized antenna ANB may be formed on a metal layer of a circuit board such as (but not limited to) a printed circuit board, and the feed elements may be formed on another metal layer to form the antenna structure shown in FIG. 12. The two metal layers may be separated by the vertical distance. The relationship among the feed zones FZ111 and FZ112 and the antenna shape centroid CT in FIG. 12 may be similar to the embodiment of FIG. 11, so it is not described repeatedly.

FIG. 11 and FIG. 12 illustrate examples with two feed elements, but it is allowed to respectively dispose four feed elements corresponding to four feed zones of an oval dual-polarized antenna as shown in FIG. 8. The similarities of application are not described repeatedly.

Figure 13:
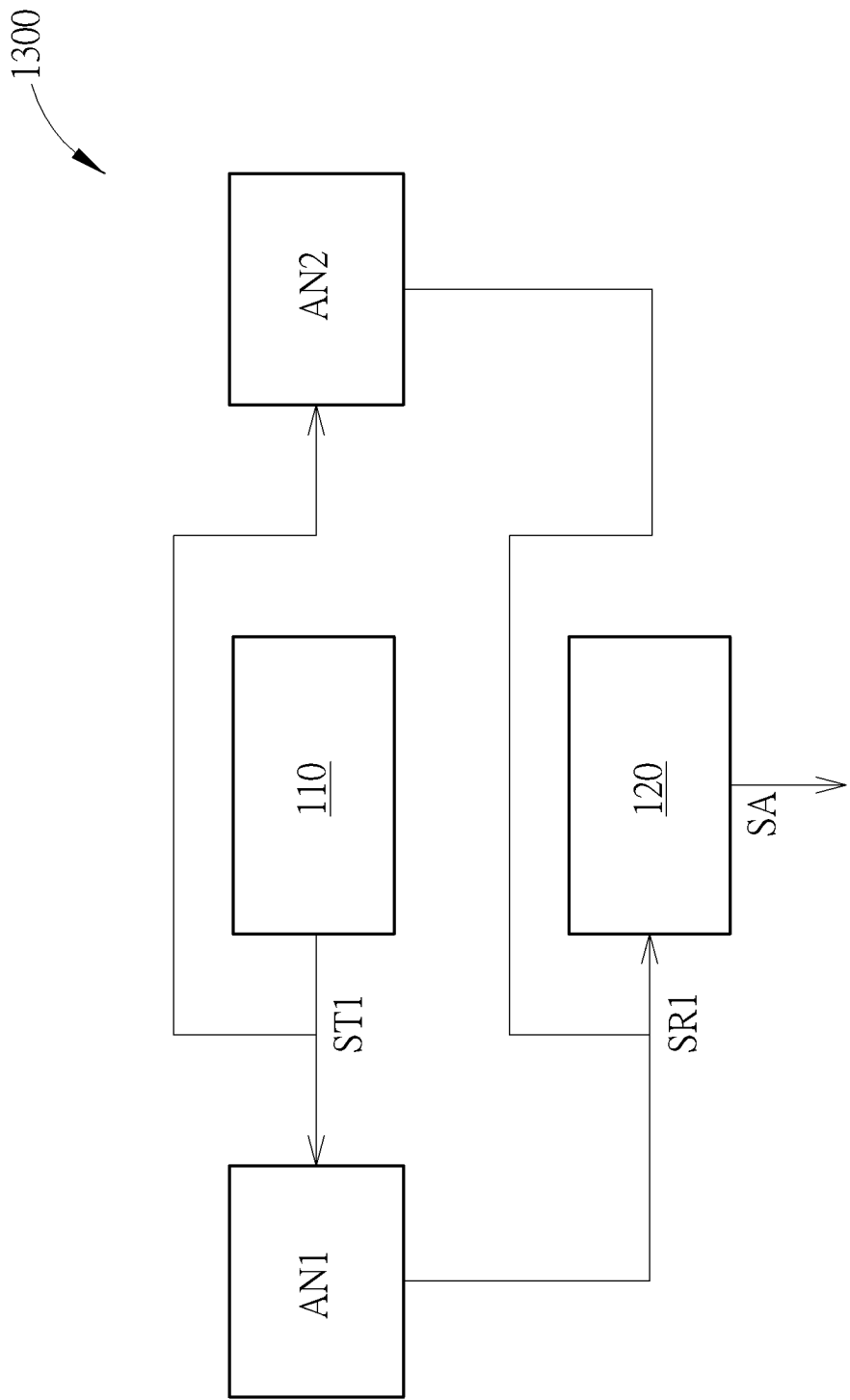
FIG. 13 illustrates a wireless signal transceiver device according to another embodiment.

FIG. 13 illustrates a wireless signal transceiver device 1300 according to another embodiment. The wireless signal transceiver device 1300 may be an embodiment of the wireless signal transceiver device 100. As shown in FIG. 13, a main difference between the wireless signal transceiver devices 100 and 1300 may be that the wireless signal transceiver device 1300 further includes a dual-polarized antenna AN2. Both the dual-polarized antennas AN2 and AN1 may be coupled to the transmission circuit 110 and the reception circuit 120, and be used to receive the first transmission signal ST1 and transmit the second wireless signal SRX (not shown in FIG. 13) substantially at the same time. The dual-polarized antennas AN2 and AN1 may form a 1×2 antenna matrix. According to another embodiment, one or more additional dual-polarized antennas may be coupled to the transmission circuit 110 and the reception circuit 120 to form an M×N antenna matrix with the dual-polarized antennas AN2 and AN1. The M×N antenna matrix may be used for receiving signals (e.g. the first transmission signal ST1) from a transmission circuit (e.g. 110) and outputting signals (e.g. first reception signal SR1) to a reception circuit (e.g. 120). The parameters M and N may be positive integers larger than zero. For example, in an M×N antenna matrix, one of M and N may be 1, and another may be an integer larger than one. Hence, the M×N antenna matrix may be a 1×N antenna matrix or an M×1 antenna matrix. In another example, both of M and N may be integers larger than one.

By means of a wireless signal transceiver device provided by an embodiment, a dual-polarized antenna which is a single radiator may be used to transceive signals. Applications of object detection or long distance signal transmission may therefore be practiced. In addition, an external coupling element or duplexer between a dual-polarized antenna and an amplifier circuit could be omitted according to embodiments. It is beneficial for reducing size of a dual-polarized antenna and a related system and simplifying a structure of the system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A wireless signal transceiver device, comprising:
  a dual-polarized antenna configured to transmit a first wireless signal and receive a second wireless signal at the same time, wherein the first wireless signal is reflected by an object to generate the second wireless signal, and the dual-polarized antenna comprises:
    an antenna shape centroid;
    a first feed zone comprising a first zone shape centroid, and configured to receive a first transmission signal, wherein the first wireless signal is generated according to at least the first transmission signal; and
    a second feed zone comprising a second zone shape centroid, and configured to output a first reception signal generated according to the second wireless signal;
    wherein a first direction defined from the first zone shape centroid to the antenna shape centroid is orthogonal to a second direction defined from the second zone shape centroid to the antenna shape centroid;
  a transmission circuit configured to generate the first transmission signal; and
  a reception circuit configured to generate a processing signal according to the first reception signal.
2. The wireless signal transceiver device of claim 1, wherein the transmission circuit is coupled to the first feed zone, and the reception circuit is coupled to the second feed zone.
3. The wireless signal transceiver device of claim 1, wherein:
  the first feed zone further comprises a first side configured to receive the first transmission signal;
  the second feed zone further comprises a second side being orthogonal to the first side and configured to transmit the first reception signal; and
  the dual-polarized antenna has a rectangular shape, and the first side and the second side are two adjacent sides of the dual-polarized antenna.
4. The wireless signal transceiver device of claim 1, wherein the transmission circuit comprises a first amplifier, the first transmission signal is corresponding to an output signal outputted by the first amplifier, the reception circuit comprises a second amplifier, and the processing signal is corresponding to the first reception signal.
5. The wireless signal transceiver device of claim 4, wherein the transmission circuit further comprises:
  a combiner coupled between the first feed zone and the first amplifier, and configured to receive a first output signal and a second output signal, generate the first transmission signal by combining the first output signal and the second output signal, and output the first transmission signal;
  wherein the output signal outputted by the first amplifier comprises the first output signal and the second output signal, and the first output signal and the second output signal form a pair of differential signals.

6. The wireless signal transceiver device of claim 4, wherein the reception circuit further comprises:
- a coupler coupled between the second feed zone and the second amplifier, and configured to receive the first reception signal, convert the first reception signal to a first input signal and a second input signal, and transmit the first input signal and the second input signal to the second amplifier;
- wherein the second amplifier is configured to generate the processing signal according to the first input signal and the second input signal, and the first input signal and the second input signal form a pair of differential signals.

7. The wireless signal transceiver device of claim 1, further comprising:
- a first feed element disposed corresponding to the first feed zone, and configured to receive the first transmission signal generated by the transmission circuit and feed the first transmission signal to the dual-polarized antenna through electromagnetic induction;
- wherein the first feed element and the transmission circuit are insulated from the dual-polarized antenna.

8. The wireless signal transceiver device of claim 7, wherein the first feed element comprises a first strip conductor and a first conductive line, the first strip conductor is disposed along an edge of the dual-polarized antenna, the first strip conductor and the dual-polarized antenna are separated by a first distance, and the first conductive line is coupled to a middle position of the first strip conductor for receiving the first transmission signal.

9. The wireless signal transceiver device of claim 8, wherein the dual-polarized antenna is formed as a rectangle with a thickness, and the first strip conductor is formed as a straight strip.

10. The wireless signal transceiver device of claim 8, wherein the dual-polarized antenna is formed as a circle or an oval with a thickness, and the first strip conductor is formed as a arced strip.

11. The wireless signal transceiver device of claim 10, wherein the dual-polarized antenna comprises a first antenna surface and a second antenna surface opposite to one another, the first antenna surface and the second antenna surface are separated by the thickness, the first antenna surface or the second antenna surface is coplanar with a reference plane, and a projection area of the first strip conductor onto the reference plane is within a projection area of the dual-polarized antenna onto the reference plane.

12. The wireless signal transceiver device of claim 10, wherein the first strip conductor is coplanar with the first conductive line, and the first strip conductor and the reference plane are in parallel and are separated by the first distance.

13. The wireless signal transceiver device of claim 10, wherein the dual-polarized antenna comprises a first antenna surface and a second antenna surface opposite to one another, the first antenna surface and the second antenna surface are separated by the thickness, the first antenna surface or the second antenna surface is coplanar with a reference plane, and a projection area of the first strip conductor onto the reference plane is outside a projection area of the dual-polarized antenna onto the reference plane.

14. The wireless signal transceiver device of claim 13, wherein the first strip conductor, the first conductive line and the reference plane are coplanar with one another, and the first strip conductor and the edge of the dual-polarized antenna are in parallel and are separated by the first distance.

15. The wireless signal transceiver device of claim 7, further comprising:
- a second feed element disposed corresponding to the second feed zone, and configured to be fed with the first reception signal from the dual-polarized antenna through electromagnetic induction and transmit the first reception signal to the reception circuit;
- wherein the second feed element and the reception circuit are substantially insulated from the dual-polarized antenna.

16. The wireless signal transceiver device of claim 1, wherein the transmission circuit is configured to generate the first transmission signal according to an input signal, the wireless signal transceiver device further comprises a processing unit configured to generate spatial information of the object according to the processing signal and the input signal, and the spatial information is related to at least one of a distance between the wireless signal transceiver device and the object, a moving speed of the object, a moving angle of the object and time of detecting the object.

17. A wireless signal transceiver device, comprising:
- a dual-polarized antenna configured to transmit a first wireless signal and receive a second wireless signal at the same time, comprising:
  - an antenna shape centroid;
  - a first feed zone comprising a first zone shape centroid, and configured to receive a first transmission signal, wherein the first wireless signal is generated according to at least the first transmission signal; and
  - a second feed zone comprising a second zone shape centroid, and configured to output a first reception signal generated according to the second wireless signal;
- wherein a first direction defined from the first zone shape centroid to the antenna shape centroid is orthogonal to a second direction defined from the second zone shape centroid to the antenna shape centroid.

18. The wireless signal transceiver device of claim 17, further comprising:
- at least one additional dual-polarized antenna configured to form an M×N antenna matrix with the dual-polarized antenna;
- where the M×N antenna matrix is configured to receive the first transmission signal and output the first reception signal, and M and N are positive integers larger than zero.

19. A wireless signal transceiver device, comprising:
- a first dual-polarized antenna configured to transmit a first wireless signal and receive a second wireless signal at the same time, comprising:
  - a first antenna shape centroid;
  - a first feed zone comprising a first zone shape centroid, and configured to receive a first transmission signal, wherein the first wireless signal is generated according to at least the first transmission signal; and
  - a second feed zone comprising a second zone shape centroid, and configured to output a first reception signal generated according to the second wireless signal;
- a first transmission circuit configured to generate the first transmission signal;
- a first reception circuit configured to generate a first processing signal related to the first reception signal;
- a second dual-polarized antenna configured to transmit the second wireless signal and receive the first wireless signal at the same time, comprising:
  - a second antenna shape centroid;

a third feed zone comprising a third zone shape centroid, and configured to receive a second transmission signal, wherein the second wireless signal is generated according to at least the second transmission signal; and a fourth feed zone comprising a fourth zone shape centroid, and configured to output a second reception signal generated according to the first wireless signal;

a second transmission circuit configured to generate the second transmission signal; and a second reception circuit configured to generate a second processing signal related to the second reception signal;

wherein a first direction defined from the first zone shape centroid to the first antenna shape centroid is orthogonal to a second direction defined from the second zone shape centroid to the first antenna shape centroid; a third direction defined from the third zone shape centroid to the second antenna shape centroid is orthogonal to a fourth direction defined from the fourth zone shape centroid to the second antenna shape centroid; the first direction is orthogonal to the third direction; and the second direction is orthogonal to the fourth direction.

20. The wireless signal transceiver device of claim 19, wherein:

the first feed zone comprises a first side of the first dual-polarized antenna;

the second feed zone comprises a second side of the first dual-polarized antenna adjacent to the first side of the first dual-polarized antenna;

the third feed zone comprises a first side of the second dual-polarized antenna;

the fourth feed zone comprises a second side of the second dual-polarized antenna adjacent to the first side of the second dual-polarized antenna;

the first side of the first dual-polarized antenna and the second side of the second dual-polarized antenna have a same first length; and the second side of the first dual-polarized antenna and the first side of the second dual-polarized antenna have a same second length different from the first length.

\* \* \* \* \*